March 19, 1963 E. DELBOVE 3,081,525

METHODS OF MAKING PRINTED ELECTRIC CIRCUITS

Filed Sept. 3, 1959 4 Sheets-Sheet 1

INVENTOR.
Emile Delbove
BY
Prangley, Baird, Clayton, Miller & Vogel,
Attys.

March 19, 1963 E. DELBOVE 3,081,525

METHODS OF MAKING PRINTED ELECTRIC CIRCUITS

Filed Sept. 3, 1959 4 Sheets-Sheet 2

INVENTOR.
Emile Delbove
BY
Prangley, Baird, Clayton, Miller & Vogel
Attys.

March 19, 1963 E. DELBOVE 3,081,525

METHODS OF MAKING PRINTED ELECTRIC CIRCUITS

Filed Sept. 3, 1959 4 Sheets-Sheet 3

INVENTOR.
Emile Delbove
BY
Prangley, Baird, Clayton, Miller & Vogel,
Attys.

METHODS OF MAKING PRINTED ELECTRIC CIRCUITS
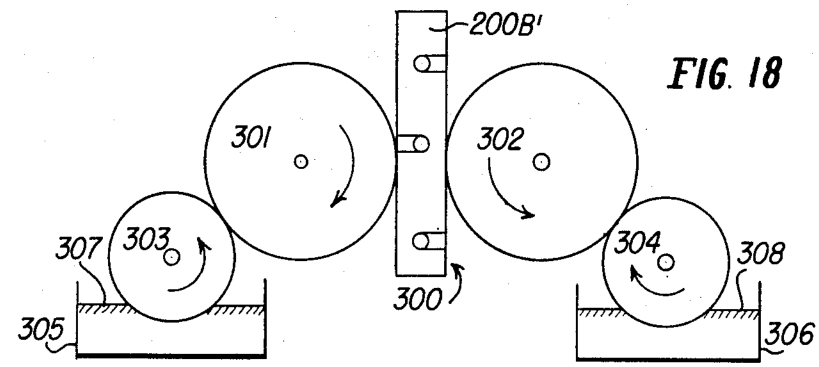
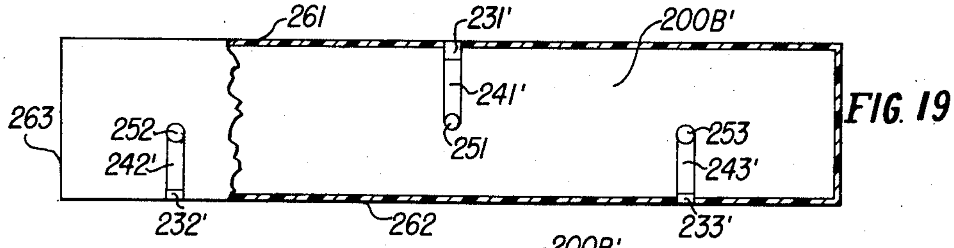
FIG. 19
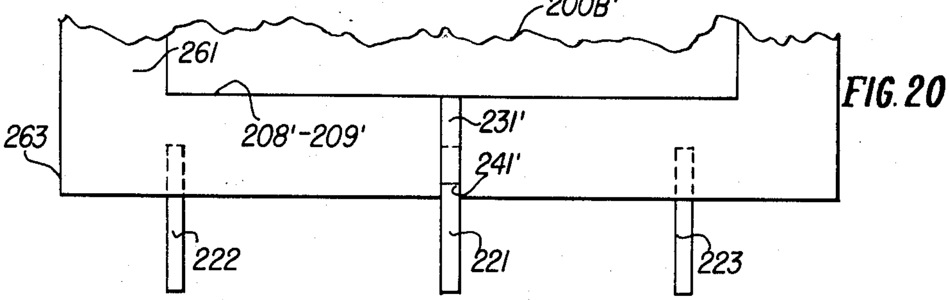
FIG. 20
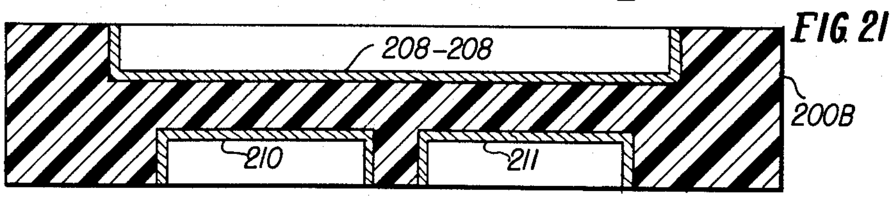
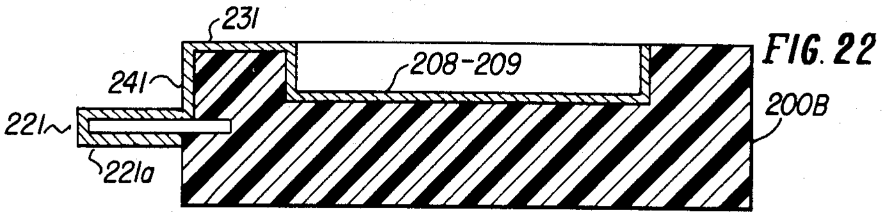
INVENTOR.
Emile Delbove
BY
Prangley, Baird, Clayton, Miller & Vogel, Attys.

United States Patent Office 3,081,525
Patented Mar. 19, 1963

3,081,525

METHODS OF MAKING PRINTED ELECTRIC CIRCUITS

Emile Delbove, Clamart, Seine, France, assignor to General American Transportation Corporation, Chicago, Ill., a corporation of New York Filed Sept. 3, 1959, Ser. No. 837,875
5 Claims. (Cl. 29—155.5)

The present invention relates to methods of making printed electric circuits, and more particularly to such methods that are suited to the manufacture of printed electric circuits upon a mass production basis. This application comprises a continuation-in-part of the copending application of Emile Delbove, Serial No. 752,656, filed August 1, 1958, now abandoned.

It is a general object of the invention to provide a method of making a printed electric circuit comprising an insulating board carrying electrically conductive circuit elements and involving improved engraving and printing steps.

Another object of the invention is to provide a method of making a printed electric circuit of the character described, wherein the outline of the desired electric circuit is incised or engraved in the face of the insulating board, and thereafter a layer of insulating material is applied to the face of the board by an offset coating or printing step, so as to enhance the circuit outline, followed by the application by metallization of the circuit elements in the circuit outline.

A further object of the invention is to provide an improved method of making a printed electric circuit of the character described, wherein the circuit elements are applied in the circuit outline provided in the face of the insulating board by chemical nickel plating, so that the resulting circuit elements consist essentially of an alloy of nickel and phosphorus.

Further features of the invention pertain to the particular arrangement of the steps of the method of making the printed electric circuit, whereby the above-outlined and additional operating features thereof are attained.

The invention, both as to its organization and method of operation, together with further objects and advantages thereof, will best be understood by reference to the following specification, taken in connection with the accompanying drawings, in which.

Figure 1:
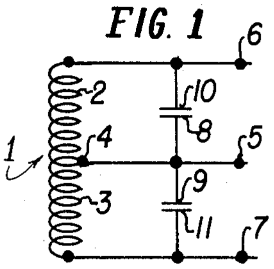
FIGURE 1 is a diagrammatic illustration of an electric circuit that may be produced as a printed electric circuit in accordance with the method of the present invention.
Figure 2:
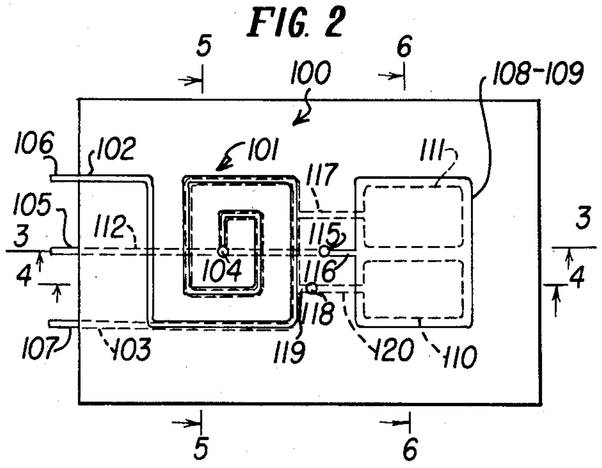
FIG. 2 is a plan view of the printed electric circuit incorporating the circuit components of FIG. 1.
Figures 5, 6:
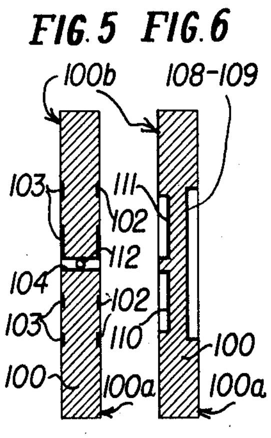
Figures 3, 4:
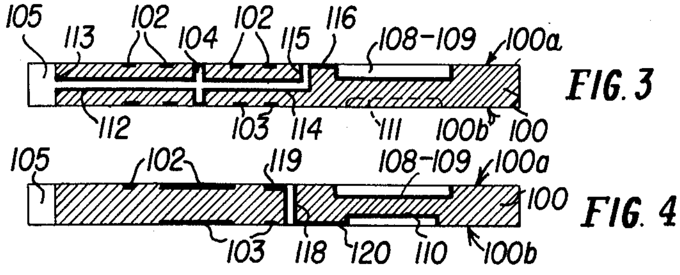
Figure 7:
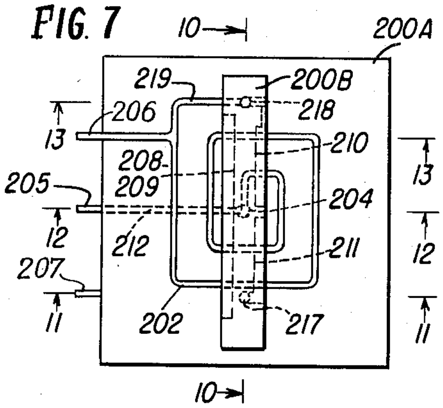
Figure 8:
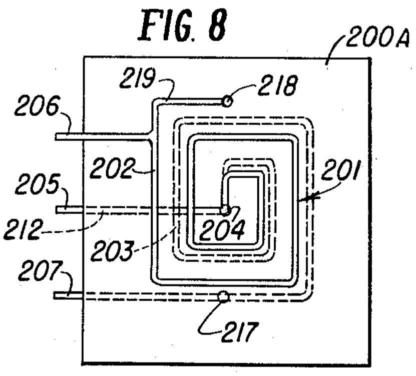
Figure 9:
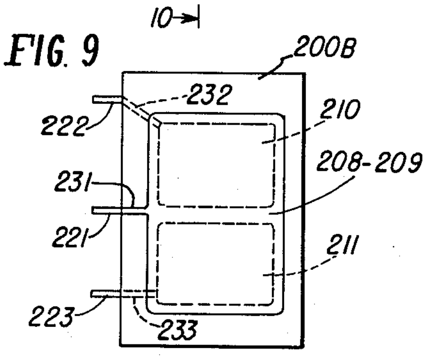
Figure 10:
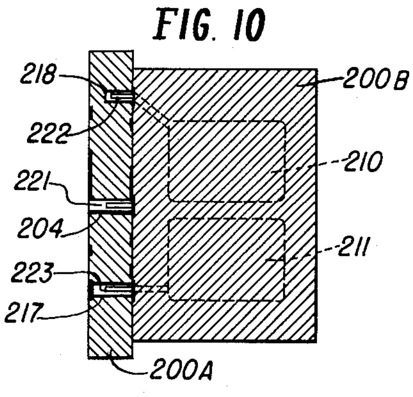
Figure 11:
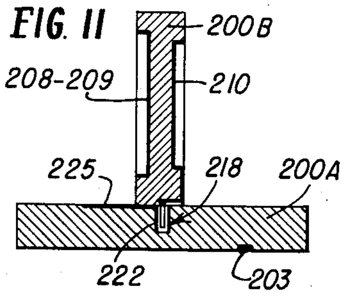
Figure 13:
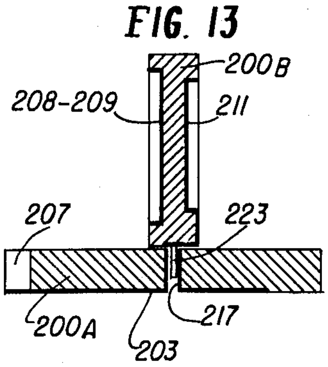
Figure 12:
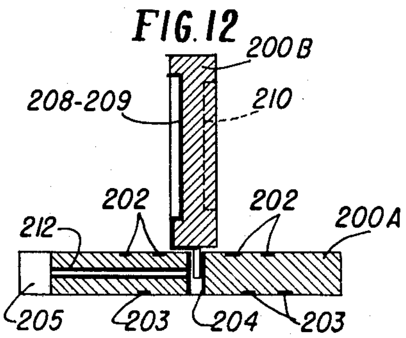
Figure 14:
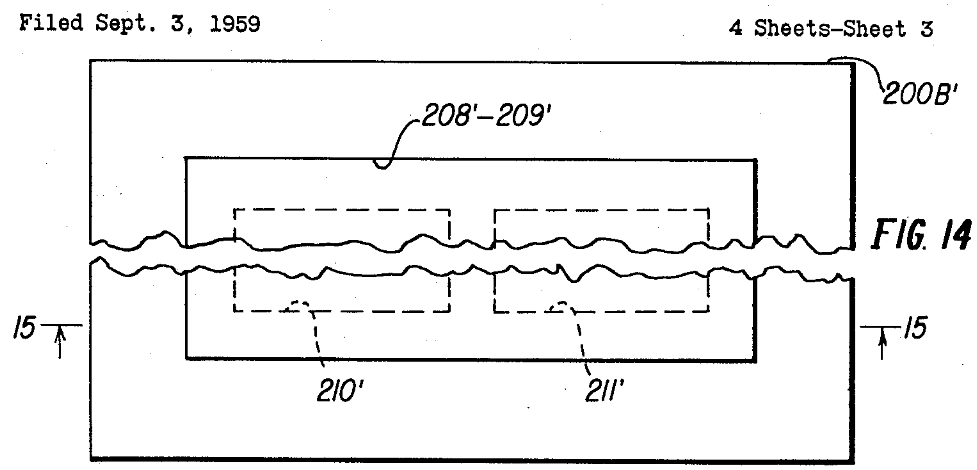
Figure 15:
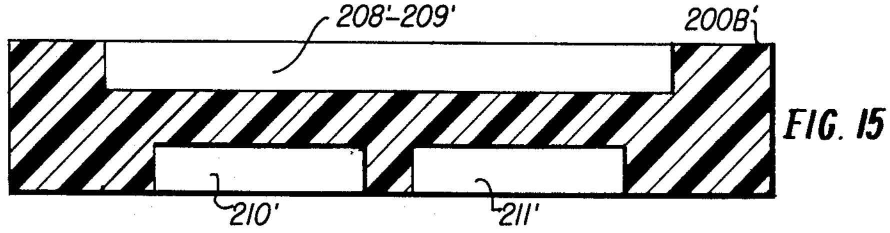
Figure 16:
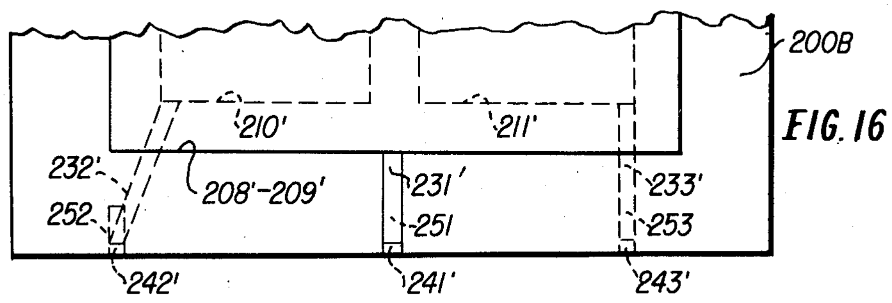
Figure 17:
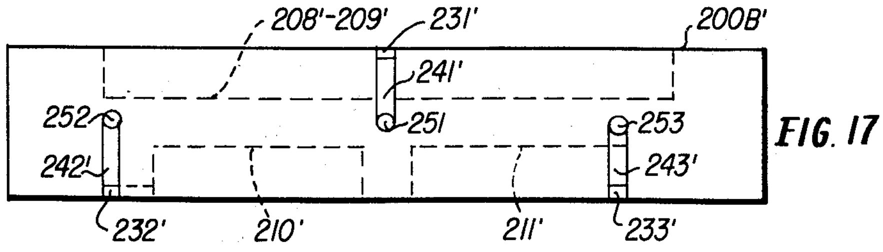

FIGS. 3 and 4 are two longitudinal sectional views of the printed electric circuit, respectively taken in the direction of the arrows along the lines 3—3 and 4—4 in FIG. 2;

FIGS. 5 and 6 are two lateral sectional views of the printed electric circuit, respectively taken in the direction of the arrows along the lines 5—5 and 6—6 in FIG. 2;

FIG. 7 is a plan view of a modified form of the printed electric circuit incorporating the circuit components of FIG. 1, this form of the printed electric circuit comprising two complementary and readily assembled parts;

FIGS. 8 and 9 are respective plan views of the two printed electric circuit parts mentioned;

FIG. 10 is a lateral sectional view of the composite printed electric circuit, taken in the direction of the arrows along the line 10—10 in FIG. 7;

FIGS. 11, 12 and 13 are three longitudinal sectional views of the composite printed electric circuit, respectively taken in the direction of the arrows along the lines 11—11, 12—12 and 13—13 in FIG. 10;

FIG. 14 is an enlarged fragmentary plan view of the insulating board that is incorporated in the printed electric circuit part shown in FIG. 9;

FIG. 15 is an enlarged longitudinal sectional view of the insulating board, taken in the direction of the arrows along the line 15—15 in FIG. 14;

FIG. 16 is an enlarged fragmentary plan view of the insulating board, shown in FIGS. 14 and 15, following the incising or engraving step involved in the method of making the printed electric circuit part of FIG. 9;

FIG. 17 is an enlarged front elevational view of the board, as shown in FIG. 16;

FIG. 18 is a diagrammatic illustration of apparatus employed in an offset coating or printing step involved in the method of making the printed electric circuit part of FIG. 9;

FIG. 19 is an enlarged fragmentary elevational view of the insulating board, following the coating step mentioned;

FIG. 20 is an enlarged fragmentary plan view of the insulating board of FIG. 19, following an additional step in the method of making the printed electric circuit part of FIG. 9;

FIG. 21 is an enlarged longitudinal sectional view of the finished printed electric circuit part, as shown in FIG. 9; and FIG. 22 is an enlarged lateral sectional view of the finished printed electric circuit part, as shown in FIG. 9.

Referring now to FIG. 1 of the drawings, there is diagrammatically illustrated a typical elementary electric circuit, including a winding 1 provided with two serially connected sections 2 and 3 with a midtap 4 therebetween. The midtap 4 is provided with an external terminal 5, and the extremities of the winding sections 2 and 3 are respectively provided with external terminals 6 and 7. A capacitor is connected across the winding section 2 between the terminals 5 and 6 and includes a pair of plates or armatures 8 and 10 respectively connected to the terminals 5 and 6; and a capacitor is connected across the winding section 3 between the terminals 5 and 7 and includes a pair of plates or armatures 9 and 10 respectively connected to the terminals 5 and 7.

Referring now to FIGS. 2 to 6, inclusive, the printed electric circuit there illustrated incorporates the circuit elements of the electric circuit diagrammatically illustrated in FIG. 1; and this printed electric circuit comprises an electrical insulating board 100 that may be formed advantageously by a molding step from a suitable synthetic organic resin, such, for example, as phenolformaldehyde condensation products. As illustrated, the winding sections 102 and 103 are respectively constituted by two printed spirals on the corresponding faces 100*a* and 100*b* of the board 100, the two printed spirals or winding sections 102 and 103 being substantially superimposed to effect the required inductive coupling through the board 100. The midtap 104 takes the form of a hollow tubular conductor extending transversely through the board 100 and integrally joining the interior extremities of the two winding sections 102 and 103. The two terminals 106 and 107 are arranged at one end of the board 100 and are respectively formed integrally with the outer extremities of the two winding sections 102 and 103. The terminal 105 is also arranged at the one end of the board 100 and is joined integrally with a hollow tubular conductor 112 extending through the body of the board 100 and formed integrally with the tubular conductor 104. The outer extremity of the tubular conductor 112 is outwardly flared, as indicated at 113, to facilitate the integral joining thereof with the terminal 105.

The two capacitors are provided with a common armature, designated by the characters 108—109, and disposed on the face 100*a* of the board 100; while the individual armatures of the two capacitors are respectively designated by the characters 110 and 111 and are disposed adjacent to each other on the opposite face 100*b* of the board 100. The tubular conductor 112 is extended by an aligned tubular conductor 114 through the board 100 from the tubular conductor 104 to a position disposed adjacent to the common armature 108—109 and is integrally jointed thereto by another tubular conductor 115 that projects through the face 100*a* of the board 100. The outer extremity of the tubular conductor 115 is integrally joined by a strap 116 to the common armature 108—109. The individual armature 110 is integrally joined by a strap 120 to a tubular conductor 118 also extending transversely through the board 100 and further integrally joined by a strap 119 to the adjacent portion of the spiral conductor 102. Also, the individual armature 111 is integrally joined by a strap 117 to the adjacent portion of the spiral conductor 103. In the arrangement, the common armature 108—109 is disposed in a suitable recess provided in the face 100*a* of the board 100; and similarly, the individual armatures 110 and 111 are respectively arranged in suitable recesses provided in the face 100*b* of the board 100; whereby the distance through the board 100 between the common armature 108—109 and the individual armatures 110 and 111 is appropriate to the desired capacitances of the two corresponding capacitors, the capacitances thereof also being determined by the areas of the individual armatures 110 and 111 facing the common armature 108—109, in a manner well-understood.

As explained more fully hereinafter, the various elements 102, 103, 104, 108—109, 110, 111, 112, 114, 115, 116, 117, 118, 119 and 120 are integrally joined to each other by virtue of the circumstance that these elements are integrally formed by a single metallization step.

Referring now to FIGS. 7 to 13, inclusive, the modified form of the printed electric circuit there illustrated also incorporates the circuit elements of the electric circuit diagrammatically illustrated in FIG. 1; and this printed electric circuit fundamentally comprises two complementary parts that are separately fabricated and then subsequently assembled. Specifically, in this form of the printed electric circuit, the two printed electric "circuit" parts respectively include the two electrical insulating boards, respectively shown at 200A and 200B. As illustrated in FIG. 8, the opposite faces of the board 200A respectively carry the two winding sections 202 and 203 that are substantially superimposed for the inductive coupling purpose, as well as the three exterior terminals 205, 206 and 207. Similarly, as illustrated in FIG. 9, the opposite faces of the board 200B respectively carry the common armature 208—209 and the individual armatures 210 and 211.

Furthermore, in this arrangement, the board 200A carries the tubular conductors 204, 217 and 218 that constitute sockets or jacks adapted frictionally to receive the respective plugs or pins 221, 223 and 222 that are carried by one edge of the board 200B; whereby the board 200B is assembled upon one face of the board 200A by the insertion of the pins 222, 221 and 223 respectively into the jacks 218, 204 and 217, as clearly illustrated in FIG. 10.

In the arrangement, the circuit elements 202, 203, 204, 205, 206, 207, 217, 218, etc., carried by the board 200A are integrally joined together by virtue of the fact that these circuit elements are formed by a single metallization step, as explained more fully hereinafter. Likewise, the circuit elements 208—209, 210, 211, 221, 222, 223, etc., carried by the board 200B are integrally joined together by virtue of the fact that these circuit elements are formed by a single metallization step, as explained more fully hereinafter.

The construction of the two forms of the printed electric circuit, described above, will be further understood from the following description (made in conjunction with FIGS. 14 to 22, inclusive, of the drawings) of the method of making one of the complementary printed electric circuit parts of the second form of the printed electric circuit described, and specifically, the printed electric circuit part shown in FIG. 9.

Referring now to FIGS. 14 and 15, the board 200B′ there illustrated, is suitably formed by any conventional step, such, for example, as by molding, and employing a suitable electrical insulating material, such, for example, as phenolformaldehyde condensation products. As illustrated, the board 200B′ has a generally rectangular configuration, and in one face thereof, there is formed a generally rectangular recess 208′—209′, and in the other face thereof, there are formed two adjacent recesses 210′ and 211′. In view of the correspondency of the reference characters utilized herein in the present description, it will be understood that the recess 208′—209′ is adapted ultimately to receive the common armature 208—209 of the two capacitors of the printed electric circuit element, as shown in FIG. 9. Accordingly, the two recesses 210′ and 211′ are disposed in adjacent side-by-side relationship with respect to each other in one face of the board 200B′ and in opposed relationship with respect to the recess 208′—209′, formed in the other face of the board 200B′.

Referring now to FIGS. 16 and 17, after the board 200B′ has been molded, three holes 251, 252 and 253 are drilled in the front edge thereof that are adapted ultimately to receive the pins 221, 222 and 223 that are subsequently connected to the respective armatures 208—209, 210 and 211.

Thereafter the board 200B′ is subjected to an engraved or stamping step, so that a shallow channel 231′ is formed or incised in one face thereof and joining the cavity 208′—209′, so that two shallow channels 232′ and 233′ are formed or incised in the other face thereof and respectively joining the cavities 210′ and 211′, and so that three shallow channels 241′, 242′ and 243′ are formed or incised in the front edge thereof. Specifically, one end of the shallow channel 241′ joins the hole 251, and the other end thereof joins one end of the shallow channel 231′; while the other end of the shallow channel 231′ joins the cavity 208′—209′. Similarly, one end of the shallow channel 242′ joins the hole 252, and the other end thereof joins one end of the shallow channel 252′ while the other end of the shallow channel 232′ joins the cavity 210′. Likewise, one end of the shallow channel 243′ joins the hole 253, and the other end thereof joins one end of the shallow channel 233′; while the other end of the shallow channel 233′ joins the cavity 211′.

After the board 200B′ has been thus prepared, the surfaces thereof are subjected to a freshening step; which step may involve sanding, grit-blasting, brushing, grinding, buffing, chemical etching, etc., so as to remove the "outer skin" thereof, in order to enhance the adsorption capacity of the surfaces noted by mechanically breaking previously existing bonds. This step produces the required surface roughening and removal of the outside resin film or skin from the surfaces mentioned of the board 200B′. Specifically, "vapor blasting" of the surfaces of the board 200B′ may be employed; and thereafter the board 200B′ is rinsed in tap water for about 5 minutes at about 60° C. Then the surfaces mentioned of the board 200B′ are subjected to a vapor degreasing step, and then cleaned, for instance, in a "Tysol No. 36" solution, this solution comprising an aqueous solution containing about 4 to 6 oz. of "Tysol" (a mildly alkaline detergent) per gallon of water. Again the board 200B′ is rinsed in tap water for about 5 minutes at about 60° C. Then the surfaces mentioned of the board 200B′ are acidified in an aqueous solution containing 10–20% sulfuric acid for a short time interval of about 1 to 5 minutes. Again, the board 200B′ is rinsed as before;

and next the surfaces mentioned thereof are activated in an aqueous palladium chloride solution containing about 1000 p.p.m. of $Pd^{++}$ for a time interval of about 15 to 20 minutes. This aqueous solution may contain palladium chloride in an amount of about 1.66 gms./liter. The board 200B' is then dried in an oven or with infrared radiation, at about 80° C. for a short time interval. Next the board 200B' is immersed in a reducing solution, such, for example, as an aqueous solution containing about 0.15 m./l. of sodium hypophosphite or hypophosphorous acid, the immersion time being about 2 minutes. The board 200B' is then rinsed in tap water for about 15 seconds, and is again dried in an oven or with infrared radiation, at about 80° C. for a short time interval.

The board 200B' thus prepared is then passed through suitable apparatus of the offset coating or printing type, as schematically illustrated in FIG. 18, so as to cause two layers 261 and 262 of electrical-insulating masking material to be deposited or applied upon the opposite faces thereof; and also a boundary layer of such masking material 263 is suitably applied to the marginal edges of the board 200B', as indicated in FIGS. 19 and 20.

Referring now to more particularly to FIG. 18, the coating apparatus 300 there illustrated essentially comprises two rotatably mounted coating rolls 301 and 302 between which the board 200B' is passed, so that the opposite faces thereof respectively engage the rolls 301 and 302. The coating rolls 301 and 302 respectively contact two fountain or supply rolls 303 and 304 that are respectively rotatably mounted in dipping relationship with respect to two fountains 305 and 306 that respectively contain two quantities 307 and 308 of liquid masking material. Of course, it will be understood that the masking material from the fountains 305 and 306 are supplied to the fountain rolls 303 and 304 as they are rotated; whereby the fountain rolls 303 and 304 offset the masking material upon the respective coating rolls 301 and 302, so that the coating rolls 301 and 302 respectively offset the masking material upon the opposite faces of the board 200B' in its passage therebetween.

Preferably, the masking material comprises ingredients that are productive upon curing of a synthetic organic resin, such, for example, as phenolformaldehyde condensation products, the ingredients of the resin being uncured when laid down upon the opposite faces of the board 200B'.

Thereafter, the board 200B' is subjected to heat-treatment in an oven at a temperature of about 325° F. for a time interval of about 30 minutes in order to react the ingredients of the masking material, so as to bring about thermosetting and curing thereof, with the resulting proruction of the synthetic organic resin mentioned; whereby the insulating masking material of the layers 261, 262 and 263 is, at this time, a smooth hard film intimately bonded to the corresponding surfaces of the board 200B', as shown in FIGS. 19 and 20.

Of course, it will be understood that the layers 261, 262 and 263 not only mask the areas of the board 200B' upon which an electric circuit element is not desired, but these layers also increase the depths of the shallow channels 231', 241', 232', 242', 233' and 243' by the thicknesses of the coresponding layers in order to enhance the outline of the desired electric circuit elements on the board 200B'.

Thereafter, the electrically conductive pins 221, 222 and 223 are driven into the corresponding holes 251, 252 and 253 formed in the front edge of the board 200B', the pins 221, etc., being securely retained in place by the frictional fits with the corresponding holes 251, etc. Preferably, the pins 221, 222 and 223 are formed essentially of aluminum, since this material may be readily plated by chemical nickel plating, as explained below.

Thereafter, the board 200B' carrying the pins 221, 222 and 223 is transferred to an aqueous nickel strike bath at room temperature (about 70° F.) and is immersed therein for about 10 to 20 minutes; and at this point, it is noted that the rinsing of the board 200B' (preceding the application of the insulating masking layers 261, 262 and 263 thereto, followed by heat-treatment and resulting curing of these layers) and preceding the immersion thereof in the aqueous nickel strike bath is very important, as it prevents decomposition of the nickel strike bath by the carrying over with the board of the absorbed $Pd^{++}$ ions.

Preferably, the nickel strike bath that is employed has the approximate composition:

| | M.p.l. |
|---|---|
| Nickel hypophosphite | 0.09 |
| Ortho-boric acid | 0.02 |
| Ammonium sulfate | 0.02 |
| Sodium acetate | 0.06 |

The pH of this nickel strike bath is adjusted, within the approximate range 5.5 to 6.0 prior to use, sulfuric acid or sodium hydroxide being employed, as required. The plating rate of this nickel strike bath is about 0.04 mil/hour.

Next, the board 200B' is rinsed in tap water, and is then pickled in sulfuric acid (10%) for about 30 seconds; and again the board is rinsed as before.

Then the board 200B' is subjected to chemical nickel plating in a chemical nickel plating bath at a temperature of about 200° F.–210° F. to obtain the desired thickness of the nickel layer deposited thereon, the chemical nickel plating bath having a plating rate of about 0.09 to 1.0 mil/hour.

Preferably, the nickel layer has a thickness in the general range 0.25 to 0.50 mil; whereby the immersion time in the chemical nickel plating bath is approximately 15 to 30 minutes.

The most suitable chemical nickel plating bath comprises an aqueous solution, and may have the approximate composition:

| | M.p.l. |
|---|---|
| Nickel sulfate | 0.09 |
| Sodium hypophosphite | 0.23 |
| Malic acid | 0.18 |
| Sodium succinate | 0.06 |

Prior to use, the pH of this bath should be adjusted in the approximate range 5.8 to 6.0, employing sulfuric acid or sodium hydroxide, as required.

Another suitable chemical nickel plating bath comprises an aqueous solution, and may have the approximate composition:

| | M.p.l. |
|---|---|
| Nickel sulfate | 0.07 |
| Sodium hypophosphite | 0.23 |
| Lactic acid | 0.30 |
| Propionic acid | 0.03 |

Prior to use, the pH of this bath should be adjusted in the approximate range of 4.5 to 4.7, employing sulfuric acid or sodium hydroxide, as required.

While either of the two above-described chemical nickel plating baths are entirely satisfactory for the chemical nickel plating of the prepared surfaces of the board 200B', the malic-succinate bath first described is preferred, since the adhesion of the nickel deposit is considerably greater employing this bath.

After the above-described chemical nickel plating step, the board 200B' carrying the chemical nickel platings thereon is removed to an oven and heat-treated at a temperature of about 325° F. for a time interval of about 30 minutes, in order to effect thorough drying and degassing thereof; whereby the finished printed electric circuit part of FIGS. 9, 21 and 22 is produced.

In this printed electric circuit part, the previously prepared surfaces of the board 200B carry, as best shown in FIGS. 9, 21 and 22, the layers 208—209, 210, 211, 231, 232, 233, 241, etc. that have been chemically plated thereon, as well as the layers that have been chemically plated upon the surfaces of the pins 221, etc. As best shown in FIG. 22, the armature 208—209 is connected via the layers 231, 241 and 221a to the pin 221 carried by the front edge of the board 200B, the layer 221a being directly carried by the surface of the pin 221; and all of the layers mentioned are integral with each other and intimately bonded to the prepared surfaces of the board 200B, as well as to the surface of the pin 221a.

Specifically, the layer 208—209 is arranged in the bottom of the corresponding cavity provided in the face of the board 200B; the layer 231 is provided in the corresponding channel formed in this face of the board 200B; the layer 241 is provided in the corresponding channel formed in the front edge of the board 200B; and the layer 221a is carried upon the exposed surfaces of the aluminum pin 221, as previously noted. Moreover, the thickness of the layers 208—209, 231, 241 and 221a are appropriate for the intended purpose of the printed electric circuit, but normally these thicknesses are somewhat less than the depths of the channels that are formed in the board 200B receiving the same. For example, the layers 231 and 241 have thicknesses that are somewhat less than the depth of the corresponding channels 231′ and 241′ respectively formed in the board 200B by the layers of insulating material 261 and 263.

In the foregoing description of the deposited layers 208—209, 231, 241, 221a, etc., reference has been made to these layers as being formed of nickel; whereas, in fact, they comprise nickel and phosphorus, containing about 6 to 12% phosphorus by weight. In other words, the chemical nickel plating process described above inherently results in the plating upon the prepared surfaces of the board 200B and upon the pins 221, 222 and 223 of this alloy that comprises an amorphous solid material containing about 88 to 94% nickel and 6 to 12% phosphorus by weight.

In the foregoing description of the method of making the printed electric circuit element, as shown in FIG. 9, it will be understood that all of the required printed circuit elements are produced simultaneously thereon by the chemical nickel plating step and that all of the individual connected electric circuit elements are integrall with each other, since they are all formed simultaneously in the chemical nickel plating step described.

Recapitulating: after the board 200B′ is molded, it is drilled to provide the necessary holes therein for supporting the pins 221, etc.; and thereafter, it is subjected to the stamping or engraving step, in order to form the required shallow channels in the surfaces thereof defining the outline of the desired circuit elements thereon. Then the surfaces of the board 200B′ are prepared by roughening and cleaning so as to freshen the same; and thereafter, upon immersion of the board 200B′ in the aqueous palladium chloride solution, minute quantities of palladium chloride adhere to the prepared surfaces mentioned. Thereafter, when the board 200B′ is immersed in the aqueous chemical reducing solution, these minute quantities of palladium chloride are reduced to metallic palladium, so as to provide dispersed minute metallic palladium particles secured to be freshened surfaces mentioned; whereby the surfaces mentioned are activated. Next, the insulating masking layers 261 and 262 are applied to the opposite faces of the board 200B′ by the offset coating or printing step described; and also the masking layer 263 is suitably applied to the marginal edges of the board; whereby the masking layers 261, 262 and 263 not only cover or mask the areas upon the board 200B′ upon which no electric circuit elements are desired, but they also define more sharply or enhance the previously formed shallow channels in the surfaces of the board 200B′ wherein the electric circuit elements are desired. Of course, when the masking layers 261, 262 and 263 are appropriately heated, the resinous material thereof becomes integral with that of the board 200B′. Subsequently, upon immersion of the board 200B′ into the aqueous chemical nickel strike bath, a nickel strike takes place upon the palladium particles noted carried by the activated areas of the surfaces of the board 200B′, where all the printed electric circuit elements are desired; and still subsequently, upon immersion of the board 200B′ into the aqueous chemical nickel plating bath, nickel-phosphorus plating takes place upon these nickel plated palladium particles, which serve as growth nuclei, so that the thin continuous integral nickel-phosphorus layers are produced upon the freshened and activated and exposed surfaces mentioned of the board 200B′, as well as upon the exposed aluminum pins 221, etc.; which integral layers mentioned are intimately and tenaciously bonded to the underlying surfaces of the board 200B′ and of the pins 221, etc.

In view of the foregoing detailed description of the method of making the printed electric circuit part shown in FIG. 9, it will be understood that the complementary printed electric circuit part shown in FIG. 8 is made in a substantially identical manner; and thereafter these two printed electric circuit parts are assembled to produce the composite two-piece printed electric circuit, as shown in FIG. 7. Also, it will be understood that the method of making the one-piece printed electric circuit of FIG. 2 is substantially the same as that described in conjunction with the making of the two-piece printed electric circuit of FIG. 7. In connection with the method of making the one-piece printed electric circuit of FIG. 2, it will be understood that the various tubular conductors 112, 114, 115, etc., are formed directly and integrally with the other circuit elements 116, 108—109, 102, etc., since in the chemical nickel plating step, the plating takes place upon all of the activated surfaces of the board 100, regardless of whether the activated surfaces mentioned comprise exterior surfaces of the board 100 or interior surfaces of the holes previously drilled through the board 100; whereby in making of the printed electric circuit of FIG. 2, all of the circuit elements carried by the board 100 are formed integral with each other.

In view of the foregoing, it is apparent that there has been provided an improved method of making a printed electric circuit that may be readily carried out in a simple and economical manner upon a mass production basis.

While there has been described what is at present considered to be the preferred embodiment of the invention, it will be understood that various modifications may be made therein, and it is intended to cover in the appended claims all such modifications as fall within the true spirt and scope of the invention.

What is claimed is:

1. The method of making a printed electric circuit, which comprises providing a board formed of phenolic resin and having a flat surface, embossing shallow channels in the surface of said board and defining the outline of desired electric circuit elements therein, whereby the unembossed areas of the resulting surface of said board are disposed in a plateau positioned above said channels, activating the entire resulting surface of said board including said channels by chemical deposition of a dispersion of minute particles of palladium on said surface, coating only the surface of said board disposed in said plateau with phenolic resin in plastic condition while leaving said channels exposed, thereby both to mask the surface of said board disposed in said plateau and to increase the effective depth of said channels, hardening the resin of said coating in order intimately to bond the same to the surface of said board disposed in said plateau, and then chemically depositing a nickel-phosphorus alloy in said channels and into intimate bonded relation with said board in order to form the desired electric circuit elements thereon.

2. The method of making a printed electric circuit, which comprises providing a board formed of a thermoset organic resin and having a flat surface, embossing shallow channels in the surface of said board and defining the outline of desired electric circuit elements therein, whereby the unembossed areas of the resulting surface of said board are disposed in a plateau positioned above said channels, activating the entire resulting surface of said board including said channels by chemical deposition of a dispersion of growth nuclei minute particles on said surface that are catalytic to a plating bath of the nickel cation-hypophosphite anion type, coating only the surface of said board disposed in said plateau with a thermosetting organic resin in plastic condition while leaving said channels exposed, thereby both to mask the surface of said board disposed in said plateau and to increase the effective depth of said channels, the resin of said coating being compatible with the resin of said board, heating said board and said coating in order to set the resin of said coating and intimately to bond the same to the surface of said board disposed in said plateau, and then immersing said board in a plating bath of the nickel cation-hypophosphite anion type throughout a suitable time interval in order to effect selective chemical deposition in the form of nickel-phosphorus alloy of the desired electric circuit elements into said channels and into intimate bonded relation with said board.

3. The method of making a printed electric circuit, which comprises providing a board formed of phenolic resin and having a flat surface, embossing shallow channels in the surface of said board and defining the outline of desired electric circuit elements therein, whereby the unembossed areas of the resulting surface of said board are disposed in a plateau positioned above said channels, activating the entire resulting surface of said board including said channels by chemical deposition of a dispersion of growth nuclei minute particles on said surface that are catalytic to a plating bath of the nickel cation-hypophosphite anion type, coating only the surface of said board disposed in said plateau with phenolic resin in plastic condition while leaving said channels exposed, thereby both to mask the surface of said board disposed in said plateau and to increase the effective depth of said channels, heating said board and said coating in order to set the resin of said coating and intimately to bond the same to the surface of said board disposed in said plateau, and then immersing said board in a plating bath of the nickel cation-hypophosphite anion type throughout a suitable time interval in order to effect selective chemical deposition in the form of nickel-phosphorus alloy of the desired electric circuit elements into said channels and into intimate bonded relation with said board.

4. The method of making a printed electric circuit, which comprises providing a board formed of a thermoset organic resin and having a flat surface, embossing shallow channels in the surface of said board and defining the outline of desired electric circuit elements therein, whereby the unembossed areas of the resulting surface of said board are disposed in a plateau positioned above said channels, activating the entire resulting surface of said board including said channels by chemical deposition of a dispersion of minute particles of palladium on said surface, coating only the surface of said board disposed in said plateau with a thermosetting organic resin in plastic condition while leaving said channels exposed, thereby both to mask the surface of said board disposed in said plateau and to increase the effective depth of said channels, the resin of said coating being compatible with the resin of said board, heating said board and said coating in order to set the resin of said coating and intimately to bond the same to the surface of said board disposed in said plateau, and then immersing said board in a plating bath of the nickel cation-hypophosphite anion type throughout a suitable time interval in order to effect selective chemical deposition in the form of nickel-phosphorus alloy of the desired electric circuit elements into said channels and into intimate bonded relation with said board.

5. The method of making a printed electric circuit, which comprises molding a board of thermoset organic resin and having a flat surface and provided with a shallow cavity therein disposed below the surface thereof and defining the outline of a first desired electric circuit element therein, embossing a shallow channel in the surface of said board and joining said cavity and defining the outline of a second desired electric circuit element therein, whereby the unembossed areas of the resulting surface of said board are disposed in a plateau positioned above said cavity and said channel, activating the entire resulting surface of said board including said cavity and said channel by chemical deposition of a dispersion of growth nuclei minute particles on said surface that are catalytic to a plating bath of the nickel cation-hypophosphite anion type, coating only the surface of said board disposed in said plateau with a thermosetting organic resin in plastic condition while leaving said cavity and said channel exposed, thereby both to mask the surface of said board disposed in said plateau and to increase the effective depths of said cavity and said channel, the resin of said coating being compatible with the resin of said board, heating said board and said coating in order to set the resin of said coating and intimately to bond the same to the surface of said board disposed in said plateau, and then immersing said board in a plating bath of the nickel cation-hypophosphite anion type throughout a suitable time interval in order to effect selective chemical deposition in the form of nickel-phosphorus alloy of the first and second electric circuit elements respectively into said cavity and into said channel and into intimate bonded relation with said board, said first and second electric circuit elements being integral with each other.

References Cited in the file of this patent

UNITED STATES PATENTS

| | | |
|---|---|---|
| 1,329,088 | Leitner | June 27, 1920 |
| 2,373,087 | Alger | Apr. 10, 1945 |
| 2,474,988 | Sargrove | July 5, 1949 |
| 2,599,710 | Hathaway | June 10, 1952 |
| 2,848,359 | Talmey | Aug. 19, 1958 |
| 2,872,391 | Hauser | Feb. 3, 1959 |
| 2,901,736 | Sylvester | Aug. 25, 1959 |